United States Patent [19]

Newman et al.

[11] 4,304,125
[45] Dec. 8, 1981

[54] METHOD AND APPARATUS FOR MEASURING FUEL FLOW

[75] Inventors: Virgil H. Newman, Washington; Frank W. Tidaback, Pekin; Wayne D. Jacobson; Donald D. Hoagland, both of Peoria, all of Ill.

[73] Assignee: Caterpillar Tractor Co., Peoria, Ill.

[21] Appl. No.: 102,195

[22] Filed: Nov. 9, 1979

[51] Int. Cl.³ .......................................... G01M 15/00
[52] U.S. Cl. ..................................... 73/119 A; 73/113
[58] Field of Search ...................... 73/119 A, 113, 861

[56] References Cited

U.S. PATENT DOCUMENTS

| | | | |
|---|---|---|---|
| 3,564,910 | 2/1971 | Wiegmann | 73/861 |
| 3,831,439 | 8/1974 | Konomi | 73/113 |
| 3,875,792 | 4/1975 | Krohn et al. | 73/119 A |
| 3,973,536 | 8/1976 | Zelders | 73/113 X |

OTHER PUBLICATIONS

Brochure from Flo-Tron, Inc. entitled Model 45 Recirculating Tank, 2 pages, no date.

*Primary Examiner*—Jerry W. Myracle
*Attorney, Agent, or Firm*—Wegner, Stellman, McCord, Wiles & Wood

[57] ABSTRACT

A fuel flow rate measuring system including an inlet (30) for receipt of liquid fuel, a flow meter (34) connected to the inlet for measuring and indicating fuel flow, and an outlet (44) for connection to a fuel consuming apparatus. A fuel flow recirculating line (42) is connected to the system between the flow meter and the outlet (44) and defines, with the outlet, a closed, constant volume fuel flow path. A gas vent (46) is disclosed in the path for venting gas therein while containing liquid fuel in the path. Also disclosed is a method of measuring the fuel flow rate to a fuel consuming apparatus.

6 Claims, 3 Drawing Figures

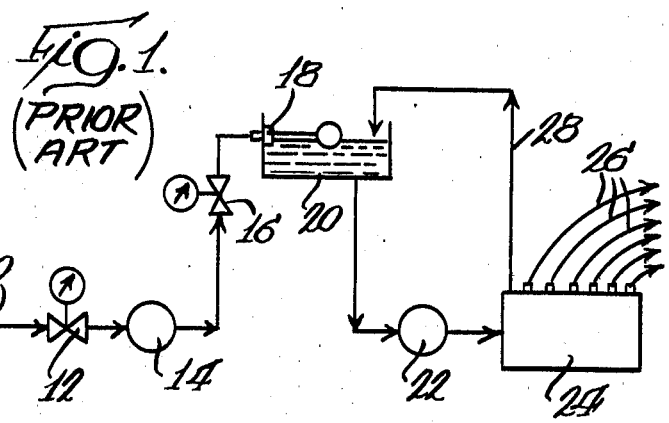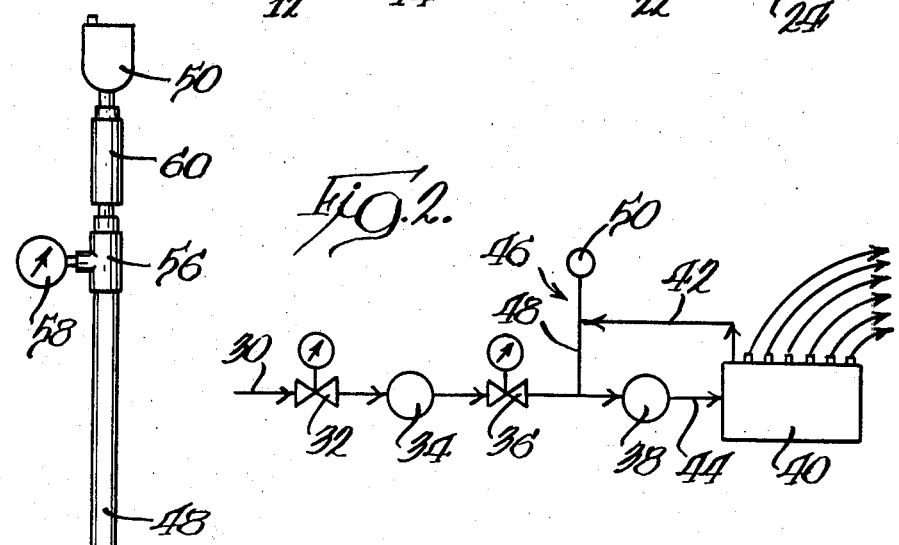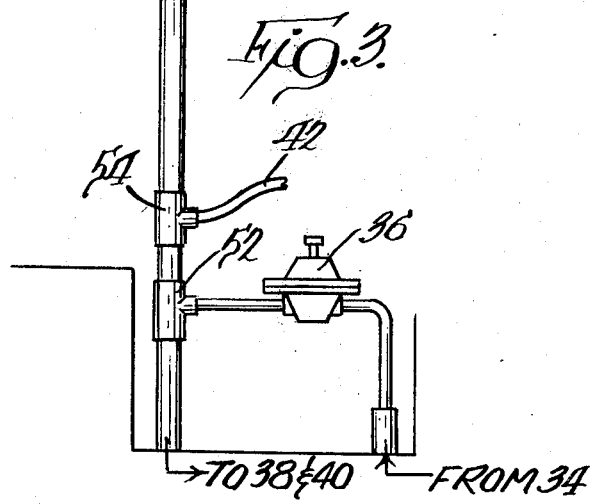

METHOD AND APPARATUS FOR MEASURING FUEL FLOW

TECHNICAL FIELD

This invention relates to the measurement of fuel flow to a fuel pump of the type that receives more fuel than it may deliver and in which provision is made for return of the excess fuel.

BACKGROUND ART

Prior art of possible relevance includes the following U.S. Pat. Nos.: 3,400,577 issued Sept. 10, 1968 to List; 3,423,998 issued Jan. 28, 1969 to Blomgren; 3,577,776 issued May 4, 1971 to Brown, 3,750,463 issued Aug. 7, 1973 to Erwin; 3,835,700 issued Sept. 17, 1974 to Gamble; 3,908,450 issued Sept. 30, 1975 to Schreiber; and 4,061,024 issued Dec. 6, 1977 to Erwin.

Many devices have been proposed for measuring the flow of fuel to a fuel pump or the like which in turn delivers the fuel to a fuel consuming apparatus such as an internal combustion engine. In a large number of cases, fuel is provided to the fuel pump in excess of its delivery capabilities to insure that the fuel pump is never starved for fuel and unable to deliver fuel quantities then being demanded by operating conditions of the fuel consuming apparatus itself. Heretofore, in such instances, accurate fuel flow measurement has been difficult to achieve in state-of-the-art apparatus for the systems may provide instantaneous readings varying by as much as ten percent for a steady state operating condition of the fuel consuming apparatus. This is due to the reliance of present day systems upon float valve controls in the systems as will be explained in greater detail hereinafter.

Moreover, these prior art systems have a relatively slow response rate to changes in fuel flow as, for example, when the operating condition of the fuel consuming apparatus is changed. When a new fuel consumption rate is established, such float valve systems take a considerable period of time to stabilize at a new fuel flow rate.

Thus, there exists a considerable need for a new and improved fuel flow measuring apparatus and method which minimizes variations in sensed flow rate and which has a rapid response to change in the fuel flow rate.

DISCLOSURE OF THE INVENTION

The present invention is directed to overcoming one of more of the problems as set forth above.

According to one aspect of the present invention, there is provided a fuel rate measuring system for use with a fuel consuming apparatus of the type which receives more fuel than is consumed with the excess recirculated. The measuring system includes an inlet for receipt of liquid fuel, a flow meter connected to the inlet for measuring and indicating the fuel flow from the inlet and an outlet which is to be connected to the apparatus and to the flow meter for receiving fuel from the latter and delivering it to the former. A fuel recirculating line has one end connected to the fuel consuming apparatus to receive excess fuel and air entrainment therefrom and another end returned to the system between the flow meter and the system outlet. The recirculating line and the outlet define a closed, constant volume path. A gas vent is disposed in the path for venting gas therein to the atmosphere while containing liquid fuel within the path.

According to another aspect of the invention, there is provided a method for determining fuel flow to such a fuel consuming apparatus provided with a fuel pump which comprises the step of measuring the flow of fuel to the fuel pump at a predetermined point in a fuel line while returning the excess flow to the fuel line between the fuel pump at the point in closed, constant volume path.

The use of a closed constant volume path, eliminates fuel flow surges through the flow meter as are normally associated with systems including float valve controls and because the volume is constant, response to fuel demands is substantially instantaneous.

BRIEF DESCRIPTION OF THE DRAWINGS

FIG. 1 is a schematic of a typical prior art fuel flow measuring system;

FIG. 2 is a schematic of a fuel flow measuring system made according to the present invention; and FIG. 3 is a side elevation of part of the fuel flow system.

DESCRIPTION OF THE PRIOR ART SYSTEM

A typical prior art fuel flow measuring system is illustrated in FIG. 1 and is seen to include an inlet 10 which may be connected to a fuel tank (not shown) to receive fuel therefrom. The inlet is connected to a conventional pressure-regulating valve 12 which provides fuel at some regulated pressure to a conventional flow meter 14. Readings on fuel flow are taken from the flow meter 14 and dependent upon system sophistication, can be taken visually or recorded through the use of conventional recorders.

Fuel exiting the flow meter 14 is then provided to a second pressure regulating valve 16 and then to a float valve 18 in an open ended tank 20. The valve 18 is intended to maintain a constant level of fuel within the tank 20 although, as will be seen, it is incapable of doing so.

Fuel from the tank 20 is directed through a heat exchanger 22 to emerge therefrom at some desired temperature and enter a fuel pump 24. As illustrated, the fuel pump 24 may be of the type used for directing fuel under pressure to each of six cylinders of, for example, a fuel injected, internal combustion engine, via lines 26.

As is well known, in a typical case, more fuel will be directed to the pump 24 from the heat exchanger 22 than will emerge from the pump 24 and the lines 26. The excess fuel is returned via a recirculating line 28 to the tank 20.

In theory, if the valve 18 is operating to maintain a constant level of fuel in the tank 20, the volume of fuel downstream from the flow meter 14 would be constant so that the flow rate of fuel through the flow meter 14 can be accurately determined. However, in practice, this is not true. Such systems do not measure directly the fuel flow rate to the engine or the like. Rather, they measure the flow that is required to keep the tank 20 filled to the desired level.

Consequently, accuracy of the system is affected as follows. There will be some motion of the float of the valve 18 due to vibration and pressure pulsations which causes fuel flow to the tank 20 to fluctuate. Moreover, the fuel level in the tank 20 must lower a finite amount before the float valve 18 overcomes friction and opens to admit more fuel to restore the fuel level to the desired point. These factors can introduce variations of up to ten percent in actual fuel rate flow through the flow meter 14.

System response time is quite slow when there is a rapid change of flow rate to the fuel consuming apparatus from the pump 24. When the flow rate increases or decreases rapidly, a different fuel level in the tank 20 must be achieved and considerable time is required before the system stabilizes at the new fuel level.

Other disadvantages of prior art systems include high maintenance times. Considerable time and effort must be spent in insuring that the float valve 18 is operating properly so as to minimize both accuracy and response time variations as mentioned above.

BEST MODE FOR CARRYING OUT THE INVENTION

The improved fuel flow rate measuring system of the present invention is shown in FIGS. 2 and 3 and is seen to include an inlet 30 which may be connected to a source of fuel such as a fuel tank or the like. Fuel from the inlet 30 is directed to a first pressure regulating valve 32 and then to a flow meter 34. From the flow meter 34, fuel is directed to a second pressure regulating valve 36. Thus far described, the system of the invention may be identical to that of the prior art.

The second pressure regulating valve 36 directs fuel to a heat exchanger 38 similar or identical to the heat exchanger 22 and then to a fuel pump 40 of the same type as the fuel pump 24. Excess fuel from the pump 40 is returned via a line 42 to a point between the flow meter 34 and the system outlet 44 to the pump 40, and specifically, between the second pressure regulating valve 36 and the heat exchanger 38. The return line 42 and all components downstream of the flow meter 34 define a closed, constant volume flow path for the fuel. The only fuel moving out of the path is that removed by the pump 40 and directed to the engine or the like. This fuel is replaced by fuel flowing through the flow meter 34 so that in essence, the system provides for direct measurement of fuel consumption rather than indirect measurement as in the prior art.

The system is completed by a gas venting means generally designated 46 in the return line 42 by which any gas in the closed path is vented. By eliminating compressible gases from the system, the volume of fuel downstream of the flow meter 34 is unaffected by pressure differences which would cause the volume of bubbles to increase or decrease.

Turning to FIG. 3, the gas venting means 46 will be described in greater detail. The same includes the vertically directed standpipe 48. The upper end of the standpipe 48 is closed by a conventional air vent valve 50 which, as is well known, will open to allow gas at the upper end of the standpipe 48 to exit the same until all gas is gone and then will close to prevent any liquid from exiting the standpipe 48.

Fuel from the flow meter 34 (not shown in FIG. 3) enters the second pressure regulating valve 36 and then is directed to the lower part of the standpipe 48 via a tee 52. By means of a connection (not shown) to the lowest end of the standpipe 48, fuel is then conveyed to the heat exchanger 38.

A second tee 54 in the standpipe 48 receives the return line 42. Near the upper end of the standpipe 48, a third tee 56 mounts a pressure guage 58. Between the tee 56 and the valve 50 is a sight glass 60.

The overall height of the standpipe 48 is limited only by the least system pressure as determined by the minimum setting on the second pressure regulating valve 36. The pressure setting must be such as to drive the fuel to the top of the standpipe 48 so that any gas above the fuel level will be driven out of the air vent valve 50. The presence of fuel or gas bubbles at this level can be checked by the sight glass 60 and the system pressure can be checked by the pressure guage 58.

If desired, the first pressure regulating valve 32 may be dispensed with in favor of any suitable constant pressure input to the system capable of providing the desired input pressure. By way of example, an elevated reservoir containing the fuel to be consumed could be employed as an alternate. In such a case, it would be desirable to have the cross-sectional area of the reservoir in a horizontal plane be as large as possible so that the withdrawal of fuel therefrom would not materially affect the height of the column of liquid, and thus the pressure applied to the flow meter 34.

INDUSTRIAL APPLICABILITY

Assuming the system is employed in measuring the fuel rate to an engine or the like, during cranking of the engine, and for perhaps the first short period of time of engine operation, any trapped air or gas in the fuel system 40 passes through the return line 42 to the standpipe 48 at which time it is vented from the system by operation of the air vent valve 50. System pressure is adjusted through operation of the second pressure regulating valve to achieve the desired fuel pump inlet pressure at the fuel pump 40. As air or trapped gas is vented, the valve 50 will close thereby providing the constant volume, closed system. This system then provides for accuracy of fuel rate measurement as the fuel is being driven into a constant volume thereby eliminating all variations in fuel flow rate for a given fuel delivery by the fuel pump 40. And because the volume remains constant for all operating conditions of the fuel consuming apparatus, response to a change in fuel consumption is immediate.

Under normal operating conditions, because fuel to the pump 40 is under pressure, the formation of air or gas bubbles in the closed system is prevented or minimized since the pressure tends to collapse the same and/or drive the gas into solution with the fuel itself. Should bubbles form, their rate of formation will be very small due to this factor and they will be vented out of the system by the air vent valve 50 at a very slow rate and thus have only an extremely minimal effect on fuel rate measurement. This is in contrast to prior art systems such as that shown in FIG. 1 wherein the fuel in the return line 28 is at atmospheric pressure which can cause a momentary increase in fuel flow to the tank to make up for the sudden reduction in return line flow 38 as a gas bubble emerges therefrom.

We claim:

1. A fuel rate measuring system for use with a fuel consuming apparatus of the type which receives more fuel than it consumes with the excess recirculated, the fuel rate measuring system comprising:

an inlet (30) for receipt of liquid fuel;
a flow meter (34) connected to said inlet for measuring and indicating fuel flow from said inlet;
an outlet (44) adapted to be connected to a fuel consuming apparatus (40) and connected to the flow meter for receiving fuel therefrom;

fuel recirculating line (42) having one end adapted to be connected to a fuel consuming apparatus to receive excess fuel therefrom and its other end returned to the system between said flow meter and said outlet; said recirculating line and said outlet, when connected to a fuel consuming apparatus, defining a closed, constant volume path; and gas vent means (46, 48, 50) in said path for venting gas therein to the atmosphere while containing liquid in said path;

said gas vent means comprising a vertically elongated standpipe (48) having its lower portion in fluid communication with said path and an air vent valve (50) closing the upper end of said standpipe.

2. The fuel rate measuring system of claim 1 further including a sight glass (60) in said standpipe immediately below said valve.

3. The fuel rate measuring system of claim 2 further including at least pressure regulating valve (32,36) connected on one side of said flow meter.

4. In a fuel rate measuring system for use with a fuel consuming apparatus (40) of the type which recieves more fuel that it consumes with the excess recirculated, an inlet (30) for receipt of a liquid fuel, a flow meter (34) connected to said inlet (30), an outlet (44) adapted to be connected to a fuel consuming apparatus (40) and to receive fuel from said flow meter (34), the improvement comprising:

gas vent means (46, 48, 50) for venting gas in the fuel to the atmosphere, said gas vent means (46,48,50) including a standpipe (48) connected to said outlet (44) and having an air vent valve (50) closing the upper end of said standpipe (48); and fuel recirculating line means (42) for delivering excess fuel from a fuel consuming apparatus (40) to said standpipe (48).

5. The fuel rate measuring system of claim 4 including pressure regulating valve means (32,36) for regulating the pressure at the outlet (44) and for adjusting the level of the fuel to a location adjacent the upper end of the standpipe.

6. The fuel rate measuring system of claim 5 including a sight glass (60) in said standpipe (48) adjacent said air vent valve (50).

* * * * *